Figure 1A:
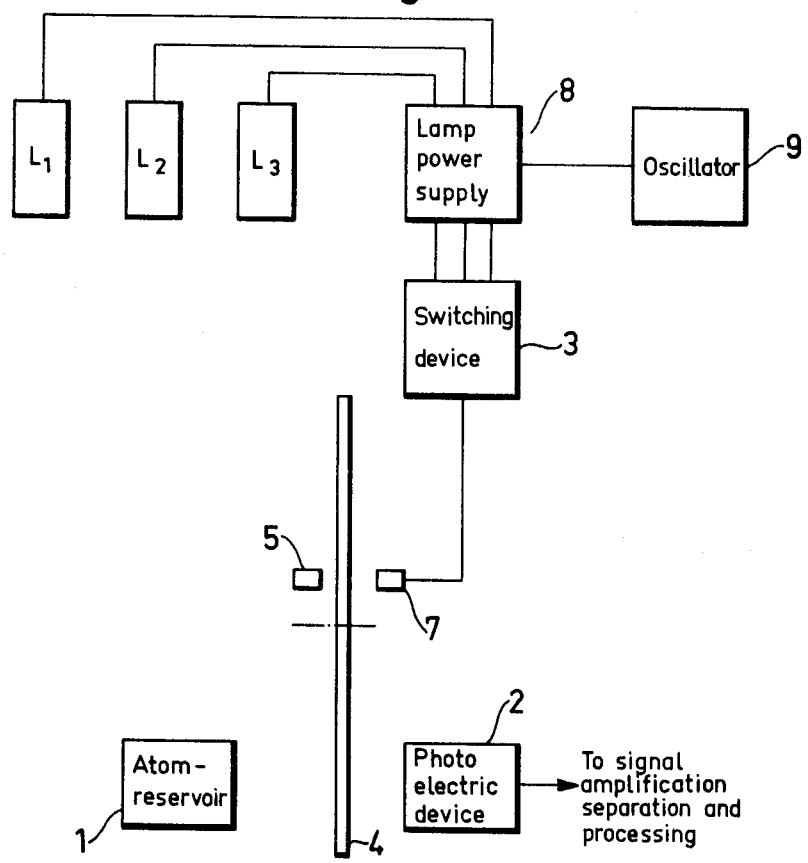

United States Patent

[11] 3,619,061

| [72] | Inventor | Douglas Graham Mitchell |
| | | Stockholm, Sweden |
| [21] | Appl. No. | 827,554 |
| [22] | Filed | May 26, 1969 |
| [45] | Patented | Nov. 9, 1971 |
| [73] | Assignee | Technicon Instruments Corporation |
| | | Tarrytown, N.Y. |
| [32] | Priorities | May 27, 1968 |
| [33] | | Sweden |
| [31] | | 7083/68; |
| | | Jan. 24, 1969, Sweden, No. 1006/69 |

[54] APPARATUS FOR SIMULTANEOUS MULTIELEMENT ANALYSIS BY ATOMIC FLUORESCENCE SPECTROSCOPY
11 Claims, 7 Drawing Figs.

[52] U.S. Cl. .................................................. 356/85,
250/71 R, 250/218, 250/226, 356/87, 356/97
[51] Int. Cl. .......................................................... G01n21/52,
G01j 3/00
[50] Field of Search .......................................... 356/85–87,
187; 250/71, 71.5, 218, 226

[56] References Cited
UNITED STATES PATENTS
2,847,899  8/1958  Walsh ........................... 356/95

3,428,401  2/1969  Buzza ........................... 356/87 X
OTHER REFERENCES

Brech, Applied Spectroscopy, Vol. 21, No. 6, Nov.- Dec. 1967, page 411.

Demers, Applied Spectroscopy, Vol. 22, No. 6, Nov.- Dec. 1968, page 797- 798.

Analytical Advances, Vol. 1, No. 2, Autumn 1968, pages 1- 15.

*Primary Examiner*—Ronald L. Wibert
*Assistant Examiner*—F. L. Evans
*Attorney*—S. P. Tedesco

ABSTRACT: Apparatus for multielement atomic fluorescence spectroscopy comprising an atom reservoir containing at least two atomic species and a plurality of light sources which are sequentially operated to excite atomic fluorescence radiation from each of the atomic species, in turn, for detection by a same photoelectric device. An optical filter arrangement is interpositioned between the atom reservoir and photoelectric device, so as to prevent unwanted radiation from reaching the photoelectric means. A plurality of readout devices are connected to the photoelectric device in phase with the respective operations of the light sources and optical filter arrangement, so as to provide an indication of the concentration of the corresponding atomic species in the atom reservoir.

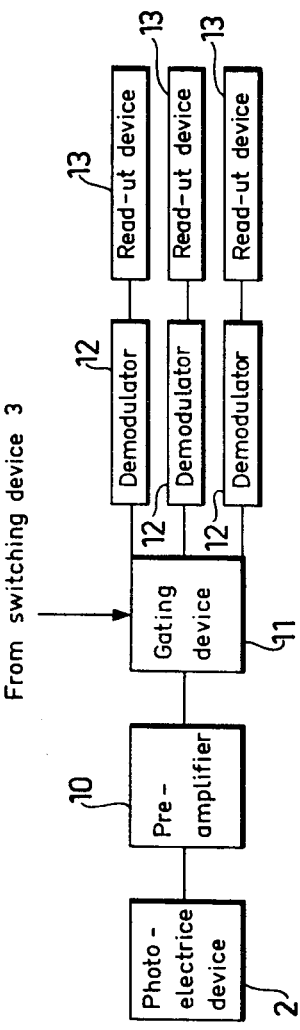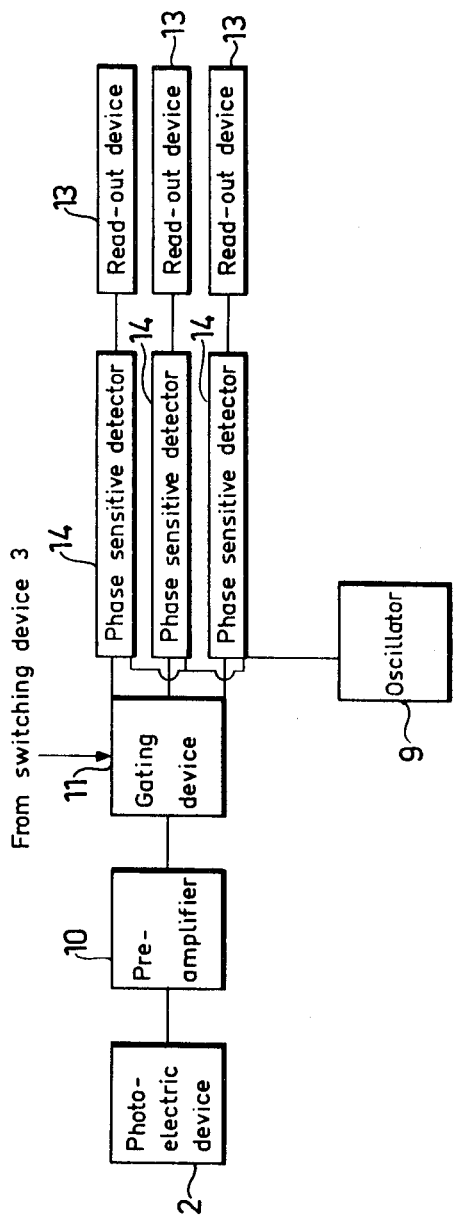

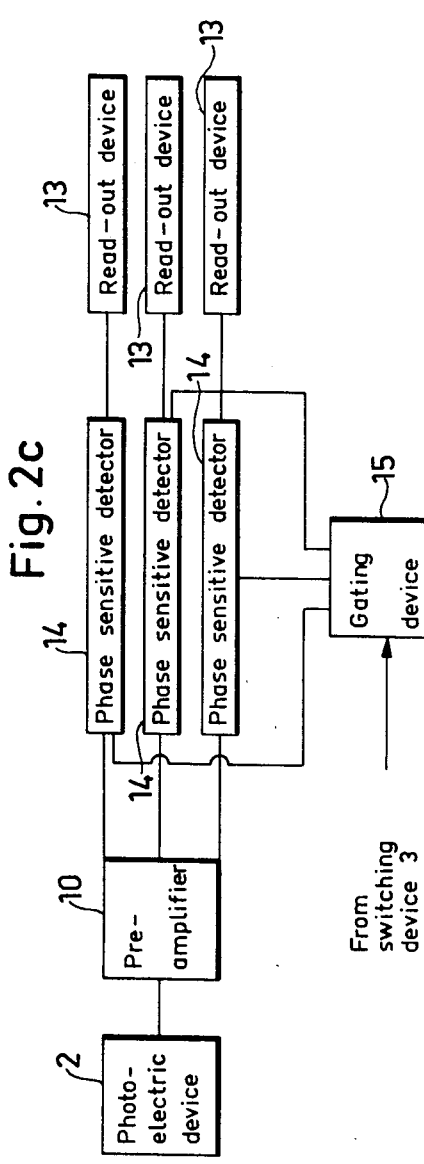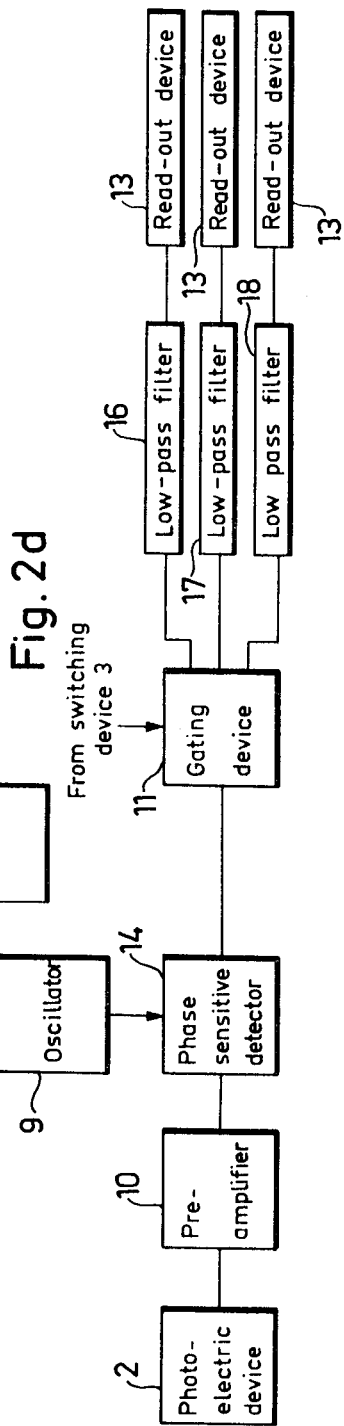

3,619,061

APPARATUS FOR SIMULTANEOUS MULTIELEMENT ANALYSIS BY ATOMIC FLUORESCENCE SPECTROSCOPY

The present invention relates to atomic fluorescence spectroscopy, an analytical technique offering many advantages in atomic analysis compared with atomic emission and atomic absorption.

Apparatus for atomic fluorescence spectroscopy usually consists of a spectral line light source, flame, monochromator, and a single-channel electronic system. This apparatus may be used for analyzing one element in a sample, or for analyzing several elements in the same sample by successive multielement analysis. In the latter case, a typical procedure would be to fit lamp one, emitting resonance radiation for element one, into the instrument, set the monochromator at the appropriate wavelength, introduce the sample into the atom reservoir, detect, measure and record the fluorescence signal from said element one, then change the lamp and wavelength setting, detect, measure and record the signal from element two, etc.

Various devices could be used to facilitate these operations, e.g. multielement lamps or continuous light sources may be used, thus avoiding the necessity to change lamps, single-element lamps may be fitted on a rotatable turret, and the monochromator may be replaced by optical filters, which can be rapidly changed. Nevertheless, these procedures still basically include the following operations: set up the instrument for element one, complete the analysis of element one, carry out at least one mechanical operation, complete the analysis of element two, etc. These procedures are difficult to automate, and obviously become increasingly inefficient with increasing number of elements for analysis per sample.

The present invention exploits atomic fluorescence radiation which has properties which permit simplification of instrumentation for multielement analysis. The advantages of atomic fluorescence spectroscopy could be stated as follows:

a. High sensitivity compared to emission and absorption methods for the analysis of many elements.

b. At low concentrations, the intensity of the fluorescent radiation is proportional to the number of atoms present in the ground state. It is therefore much less sensitive to changes in the temperature of these atoms than the thermally-excited emission techniques of arc and spark emission spectrography and atomic emission spectroscopy.

c. The light source may be modulated and the fluorescent radiation may be measured using an AC detection system. This reduces the interference to the measurement process caused by radiation from radiating species in the atom reservoir.

d. Atomic fluorescence spectroscopy gives linear calibration curves over a large concentration range.

e. Fluorescence spectra arise from absorbed resonance radiation and are therefore simple.

f. The magnitude of the output signal can be controlled by varying the intensity of the exciting radiation.

The main object of the present invention is to provide an improved apparatus for simultaneous multielement analysis based on the technique of atomic fluorescence spectroscopy in which several elements can be simultaneously analyzed using only a single detector system, whereby simultaneous multielement analysis is defined as the analysis of several elements in one sample in one operation, without making any changes in the instrument during the analysis of any one sample.

A further object is to provide an apparatus which may be initially set up to analyze the required number of elements in a sample, and such that it is not necessary to alter the instrument, or carry out any mechanical operation, between the determination of successive elements in any one sample. This is efficient, and greatly facilitates automated analysis.

A still further object is to provide an apparatus which is suited for use with pulsed light sources, and which can fully exploit the high pulse light intensities thus obtained to improve the sensitivity of the analysis.

A still further object is to provide an apparatus which is extremely cheap compared with any conceivable emission or absorption instrument capable of simultaneous multielement analysis, as defined above.

A still further object is to provide an apparatus in which spectral interference arising from fluorescent radiation from another atomic species in the atom reservoir cannot occur. The apparatus does not require optical devices to resolve fluorescent radiation from more than one atomic species, fluorescent radiation is selectively excited from each atomic species in turn using appropriate line light sources, and thus fluorescent radiation is automatically resolved.

A still further object is to provide an instrument which permits the effective use of internal standards.

A still further object is to provide an apparatus which can be permanently set up for the analysis of a reasonably large number of elements, and which permits very rapid selection of combinations of some of these elements for analysis.

Some embodiments of the invention will now be described by way of examples, reference being made to the accompanying drawings in which FIG. 1a shows the principle for illuminating an atom reservoir with several light sources in turn, where the filtering devices are placed on a wheel.

Figure 1B:
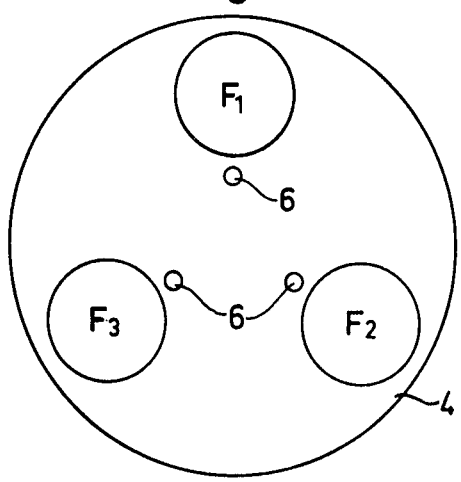

FIG. 1b shows the wheel according to FIG. 1 in front view.

Figure 3:
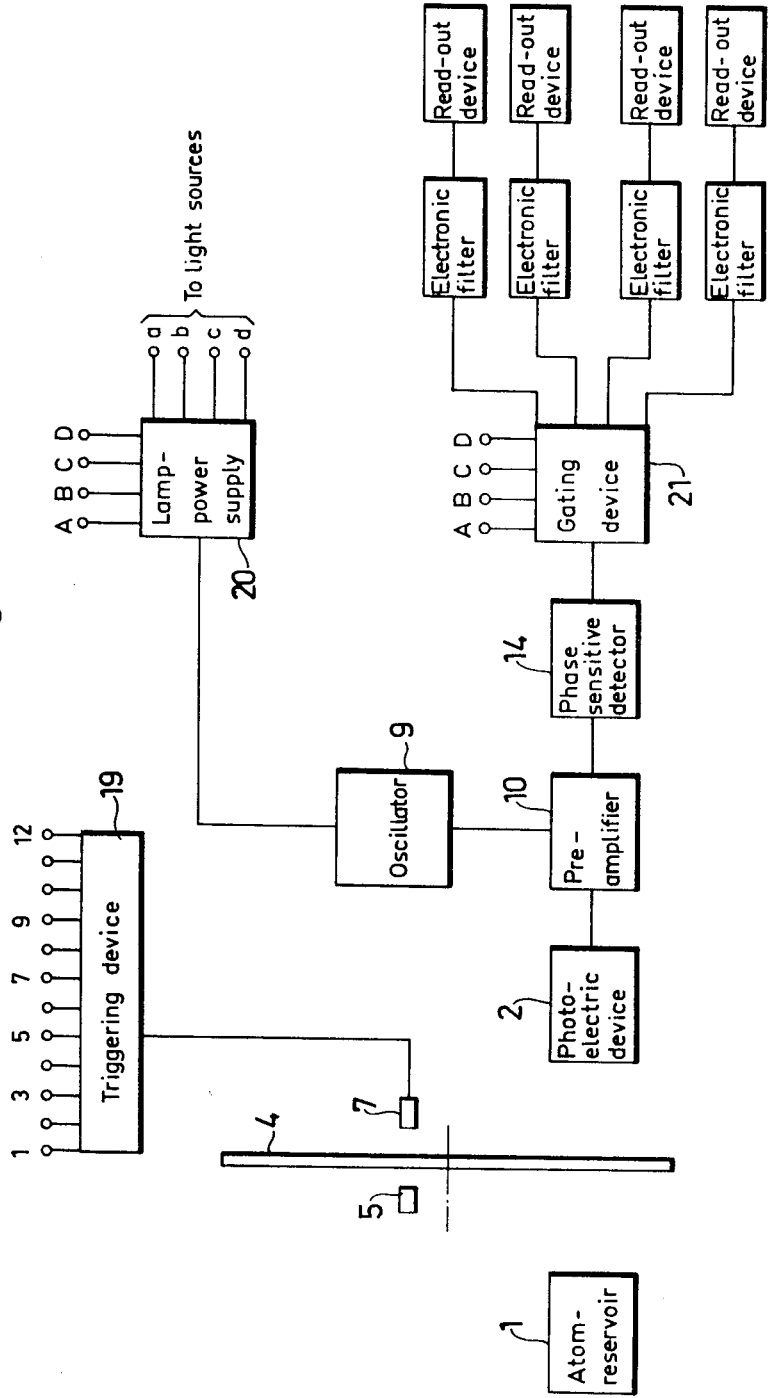

FIG. 2a–d describes various methods of separating the electrical signals arising from pulses of fluorescent radiation and FIG. 3 shows, in principle, an apparatus which facilitates rapid changeover of elements for analysis.

An apparatus according to the invention comprises a device for producing atoms of the elements of interest, hereinafter called the atom reservoir 1, which is usually a pneumatic nebulizer flame system. A series of light sources $L_1$, $L_2$, $L_3$ etc. are placed so as to enable illumination of the atom reservoir 1 without directly illuminating a photoelectric device 2, which is to be used for measuring radiation. A switching device 3 causes each light source $L_1$, $L_2$, $L_3$ in turn to illuminate the atom reservoir 1. Filter devices between the atom reservoir 1 and the photoelectric device 2 prevent unwanted radiation from the atom reservoir 1 and from other sources, if any, from reaching the photoelectric device 2. This could preferably be achieved with optical filters $F_1$, $F_2$, $F_3$ etc. In multielement analysis the intensities of fluorescent radiation at a number of different wavelengths must be measured and a number of different optical filters each transmitting radiation of a certain wavelength will be required.

The apparatus according to the invention also comprises an optical-electrical system capable of detecting the pulses of fluorescent radiation from the atom reservoir 1 and converting them into a series of electrical signals. The electrical system must also separate these signals. Thus, all signals arriving from fluorescent radiation generated by lamp $L_1$ must be separated from signals arriving from lamps $L_2$ and $L_3$ and their respective magnitudes must be measured. It is not likely that one pulse of radiation generated from $L_1$ will contain enough information to give an accurate measure of the concentration of an atomic species present in the atom reservoir 1. The apparatus will therefore require some method of obtaining an average value for a number of these signals, for instance all signals of type $S_1$ should be separated from other signals and sent to an integration circuit. The other types of signals presenting $S_2$ and $S_3$ will be similarly treated.

The purpose of the light sources in the apparatus according to the invention is to excite fluorescent radiation from atoms in the atom reservoir. Each source emits atomic radiation characteristic of an element, and if this element is present as atoms in the atom reservoir, it will absorb some of this radiation and remit it as fluorescence radiation. If light sources emitting radiation characteristic of more than one element simultaneously illuminate the atom reservoir 1, fluorescent radiation from more than one atomic species may be produced, and it may be difficult for the optical-electrical system to efficiently separate them. Thus, it is desirable that only one light source at the time is permitted to illuminate the flame. There are several possible methods of doing this, e.g. a rotating mirror could direct light from one light source after the other onto the flame. Alternatively, the light sources could be placed around a rotating wheel fitted with a hole or slot, which permits each light source in turn to illuminate the flame.

According to the embodiment of the invention now described (see FIG. 1) light sources $L_1$, $L_2$, etc. are placed in any convenient position, so as to be able to illuminate the atom reservoir 1. The only restriction is that light from these sources must not illuminate the photoelectric device 2 to be used to detect fluorescent radiation. A wheel 4 is placed in front of the photoelectric device, and optical filters $F_1$, $F_2$, etc., capable of transmitting fluorescent radiation arising from light sources $L_1$, $L_2$, etc. respectively, are mounted on the wheel. The wheel is continuously rotated. When filter $F_1$ is in front of the photoelectric device, light source $L_1$ is switched on, emits a short pulse of radiation, and is switched off. $L_2$, $L_3$, etc., are each pulsed in turn when the appropriate filters are in front of the photoelectric device. When filter $F_1$ again reaches the photoelectric device $L_1$ is pulsed again, after having a relatively long rest between the pulses.

The rotating wheel activates a further device which generates an electrical pulse when each optical filter reaches a position in front of the photoelectric device 2. This device could, for example, consist of a small light 5 which passes through small holes 6 in the wheel 4, at the appropriate stages of the wheel's motion, to a photodiode 7. The resulting electrical pulses pass to a switching device 3 where they are formed into pulses of appropriate duration and passed to a lamp power supply unit 8. These pulses cause each light source $L_1$, $L_2$, $L_3$ in turn to repetitively illuminate the atom reservoir 1.

An oscillator 9 generates a square wave signal of a definite frequency which is used to modulate the light sources.

An analysis is carried out by illuminating the atom reservoir with each light source in turn $L_1$, $L_2$, $L_3$; $L_1$, $L_2$, $L_3$, etc. This gives a series of signals each of which is related to the concentration of a certain element in the atom reservoir. It is unlikely one such signal from a particular element will give a sufficiently accurate measure of this concentration. The usual procedure will be to separate signals into groups, each group consisting of signals from one element. A sufficient number of individual signals will then be added, so as to give an accurate measure of the concentration of each element. The quantitative analysis can be completed by comparing the integrated signals thus obtained with those obtained from samples of known composition. Alternatively, internal standards may be used.

The excitation process is carried out in rapid succession and a number of times; and this permits the effective use of internal standards. Thus element I could be an element not normally present in the sample, a standard amount of element I could be added to all samples, and signals from elements II, III, etc. measured relative to that from element I. This procedure will compensate for errors due to, for example, drift in flame conditions.

This method of lamp operation has the following advantages:

a. It achieves the desired aim of illuminating the atom reservoir with each light source in turn.

b. The light sources are not emitting radiation at times when it is not needed. This extends lamp life.

c. If some types of light sources, e.g. hollow cathode lamps, are operated in short pulses, with relatively long rest periods between these pulses, they can be operated at substantially higher light intensities for the duration of the pulse. This is highly desirable with atomic fluorescence spectroscopy, since higher light intensities give higher fluorescent radiation intensities, and hence better sensitivity, precision and detection limits. This higher intensity is possible because the amount of light emitted by a lamp increases with increasing energy dissipated in the lamp. With conventional continuous operation of light sources, the amount of energy which can be dissipated in the lamp is limited by physical factors, e.g. with a hollow cathode lamp the hollow cathode becomes hot, and the metal constituting the cathode evaporates rapidly, thus shortening lamp life. With pulsed operation high-pulse energies can be used while maintaining a low mean rate of energy dissipation in the lamp source. This will keep the temperature of the lamp at a low average value.

d. With pulsed light sources, the position of the lamp light sources is not nearly as restricted as with mechanical switching devices, such as mirrors or shutters. This can be taken advantage of e.g. to vary the path length of the illuminating light beam through the atom reservoir.

With the apparatus according to the invention the atom reservoir 1 emits a sequence of pulses of fluorescence radiation. These pulses are detected by the photoelectric device 2, such as a photomultiplier, which converts them into electrical signals. The three light sources $L_1$, $L_2$ and $L_3$ each excite pulses of fluorescent radiation from three different atomic species $A_1$, $A_2$ and $A_3$ present in the atom reservoir 1. A sequence of pulses from the light sources gives rise to a sequence of electrical signals from the photoelectric device $S_1$, $S_2$, $S_3$; $S_1$, $S_2$, etc. These signals must be amplified, separated, and their respective magnitude measured. There are several possible methods for separating these signals and collecting like signals together, e.g. they could pass through a preamplifier 10 (FIG. 2a) and then to a commutator or other gating device 11. This latter device could be controlled by switching device 3, such that it sends each type of signal ($S_1$, $S_2$ or $S_3$) to a separate amplifier and demodulator 12, followed by readout devices 13, see FIG. 2a.

Alternatively, the signals could be fed to a preamplifier 10 and then through a similar gating device 11 to each of three phase-sensitive detectors 14. Phase-sensitive detectors only function when they are supplied with a reference signal of the same frequency as the modulation frequency of the light, and this can be supplied by the oscillator 9, see FIG. 2b.

Alternatively, the signals could be fed via a preamplifier to all three phase-sensitive detectors 14 with the reference signal from the oscillator 9 sent to each phase-sensitive detector in turn by a commutator or gating device 15. This effects the required signal separation, see FIG. 2c.

The electronic system according to the invention separates the signals arising from pulses of fluorescent radiation in an efficient manner. These pulses of fluorescent radiation are usually of low intensity, compared with other radiation which reaches the photoelectric device 2. This latter radiation generates electrical noise, and the electronic detecting system should be designated to give a high signal-to-noise ratio to efficiently isolate the fluorescent radiation from other forms of radiation. The electronic system will almost certainly require the use of a phase-sensitive detector 14 (synonymous with phase-sensitive demodulator, and lock-in amplifier). It is desirable that the same phase-sensitive demodulator handle all types of signals $S_1$, $S_2$, etc., to minimize instrument cost. Furthermore, it is desirable that all types of signals pass along the same circuit for as much of the signal-processing operation as possible, so as to avoid independent electronic drift, as may occur in, for example the systems described in FIG. 2a, 2b and 2c.

A system which fulfills these conditions is shown in FIG. 2d. A sequence of signals $S_1$, $S_2$, $S_3$; $S_1$, $S_2$ etc., arising from fluorescent radiation passes from the photoelectric device 2 to the amplifier 10, and then to the phase-sensitive detector 14 (usually a diode switch). The demodulated, unsmoothed signals pass to the gating device 11, which directs all signals of type $S_1$ to a low-pass filter circuit 16, all signals of type $S_2$ to low-pass filter circuit 17 and all signals of type $S_3$ to low-pass filter circuit 18. Mean signals are read using convenient readout devices 13.

The apparatus described above should be suitable for the analysis of a large number of different elements, although in many cases the analysis of only two or three elements will be required from a particular analytical sample.

For example, the user may require the apparatus for the analysis of a total of 12 elements 1–12 of which various combinations of up to four elements may be required from any one analytical sample. With all atomic absorption and atomic fluorescence apparatus using light sources which emit line spectra, the user is required to select light sources $L_1$, $L_2$, $L_3$ and $L_4$, which emit appropriate spectral lines, which can be absorbed by atoms of the elements of interest. With monochromator instruments, the user must also select the appropriate wavelength for measurement; and with filter instruments, the user must select the appropriate optical filter. With the rotating filter wheel system described above, filters $F_1$, $F_2$, $F_3$ and $F_4$, corresponding to light sources $L_1$, $L_2$, $L_3$ and $L_4$, could be selected and placed upon the wheel. When the user wishes to use his instrument for the analysis of elements 5, 6, 7 and 8, he would remove the light sources $L_1$–$L_4$ and the filters $F_1$–$F_4$ and fit light sources and filters appropriate for elements 5–8. Light sources can be changed very rapidly, but it is inconvenient to physically exchange filters. In the apparatus according to the invention a filter wheel 4 is constructed with all appropriate filters $F_1$, $F_2$......$F_{12}$ fitted around the wheel. An electronic system is constructed, such that every time a filter reaches the position in front of the photoelectric device 2, an electrical pulse is generated. This could be done, for example, as in FIG. 1. These pulses pass to a device 19, which shapes them and sends them to each of 12 output points in turn, such that when filter $F_1$ reaches a position in front of the photoelectric device 2, a pulse of appropriate shape is given out at output 1 on device 19.

A lamp power supply unit 20 is capable of operating up to four light sources. It is so designed so that it requires a trigger pulse from triggering device 19 for each lamp to operate. A further gating device 21 is also designed so that it requires the same trigger pulse to send output signals from the phase-sensitive detector 14 to their respective electronic filter circuits and readout devices.

Say, for example, the user wishes to analyze elements 1, 5, 9 and 11, requiring light sources $L_1$, $L_5$, $L_9$ and $L_{11}$ and filters $F_1$, $F_5$, $F_9$ and $F_{11}$. The user fits light sources $L_1$ to $a$, $L_5$ to $b$, $L_9$ to $c$ and $L_{11}$ to $d$ on lamp power supply unit 20, connects points A on 20 and on the gating device 21 to point 1 on triggering device 19. Points B are connected to 5, points C to 9 and points D to 11, see FIG. 3. The rotating filter wheel thus activates the light sources to be pulsed at the appropriate stage of the wheel's cycle for the appropriate length of time. All signals arising from element 1 will pass from output point $a$ on device 21 to an appropriate electronic filter circuit, signals from element 5 will pass from output point $b$ on 21, etc. (FIG. 3). A similar procedure is adopted for the analysis of, say, elements 2, 4, 6 and 8.

Each fluorescence signal is measured over a fraction of the total analysis time, but this is no particular disadvantage in fluorescence with pulsed light sources. The short observation time is compensated for by high-intensity pulses from the light sources. For example, a hollow cathode lamp capable of emitting light of intensity $I_o$ during continuous operation could be pulsed with a pulse: rest ratio of 1:10. The pulse current could be increased to say 10 times that used during continuous operation while still giving the same mean current and mean cathode temperature. The pulse light intensity would be $10\ I_o$, giving ca. 10 times greater fluorescent intensity. The net effect is to give about the same total signal as with continuous operation, but at a much better signal: noise ratio, since the signal is measured over ca. one-tenth of the total analysis time.

The same applies to all elements being analyzed, and the total analysis time for a number of elements should not be appreciably longer than the time required for the analysis of one element using a continuously operated source.

Similar considerations apply to some other types of light source.

What I claim is:

1. In an apparatus for analysis by atomic fluorescence spectroscopy comprising an atom reservoir containing at least two atomic species, a plurality of fixedly positioned light sources for illuminating said atom reservoir and each capable of exciting fluorescent radiation from a different atomic species in said atom reservoir, photoelectric means for converting fluorescent radiation arising from each of said atomic species in said atom reservoir into electrical signals, optical filter means for preventing unwanted radiation from reaching said photoelectric means, means for operating each of said light sources, in turn, to repetitively illuminate said atom reservoir and for modulating each of said light sources at a given frequency such that fluorescent radiation excited from corresponding ones of said atomic species in said reservoir is modulated at said given frequency, said optical means being operative to pass said modulated fluorescent radiation being then emitted from said atom reservoir to said photoelectric means, and means responsive to said photoelectric means for processing and separating each of said electrical signals from said photoelectric means, whereby said apparatus is capable of simultaneous multielement analysis of several elements in one sample in one operation, without making any changes in the instrument during the analysis of any one sample, said electrical signals being indicative of the concentration of corresponding atomic species in said atom reservoir, said processing means including a plurality of readout devices corresponding to each atomic species in said atom reservoir for receiving said electrical signals and commutator means for selectively connecting said readout devices to said photoelectric means in phase with the operation of said light sources and said optical means.

2. The apparatus of claim 1, wherein said optical means comprises a filter wheel placed between said atom reservoir and said photoelectric means, said filter wheel carrying appropriate optical filters for transmitting fluorescent radiation excited from corresponding ones of said atomic species in said atom reservoir and for preventing unwanted radiation from reaching said photoelectric means, means for rotating said filter wheel to position each optical filter, in turn, between said atom reservoir and said photoelectric means.

3. The apparatus of claim 1, wherein said processing means comprises means for integrating said electric pulses corresponding to a same fluorescent radiation, so as to provide an indication of the concentration of the corresponding atomic species in said atom reservoir.

4. The apparatus of claim 1, wherein said processing means includes phase-sensitive detector means.

5. Apparatus of claim 4, further including means for supplying said phase-sensitive detector means a reference frequency the same as said given frequency.

6. Apparatus of 5, wherein said modulating means and said supplying means are the same.

7. Apparatus of claim 1, wherein said processing means includes phase-sensitive detector means connecting said commutator means to each of said readout devices, and means for supplying a reference signal to each of said phase-sensitive detector means having a same frequency as the frequency at which a corresponding light source is modulated.

8. The apparatus of claim 7, wherein said modulating means includes means for modulating each of said light sources in sequence and at a same frequency.

9. The apparatus of claim 8 further including electrical filter means connecting said phase-sensitive detector means and said readout means.

10. The apparatus of claim 2, further comprising means responsive to the positioning of each optical filter, in turn, between said atom reservoir and said photoelectric means for controlling said operating means to operate corresponding one of said light sources, whereby fluorescent radiation is excited from a corresponding atom species and passed to said photoelectric means.

11. The apparatus of claim 2, wherein said plurality of optical filters is equal in number and corresponding to said light sources.

* * * * *